Patented Dec. 25, 1945

2,391,837

UNITED STATES PATENT OFFICE 2,391,837

NITROSO BETA NAPHTHOL COMPOSITION

Victor L. King, Bound Brook, and Henry Philip Orem, North Plainfield, N. J., assignors to American Cyanamid Company, New York, N. Y., a corporation of Maine Application September 7, 1944, Serial No. 553,120

2 Claims. (Cl. 106—218)

This invention relates to an improved method of combining two products capable of forming with each other an eutectic mixture and to the compounds so produced; the products being obtained in a form which is free from dusting and readily dried. In particular the process relates to an improved method of forming pellets from nitroso beta naphthol and abietic acid.

Commercial practice frequently requires the handling in large quantities of powdered materials which are to be eventually incorporated into a single composition. Such materials present inherent difficulties due to bulking, dusting and the like and often cause disagreeable physiological effects. Often these difficulties could be overcome if two or more of the materials could be precombined. Generally, however, attempts to combine materials in this way as by dry or wet mixing or by co-precipitation result in the production of impalpable powders. These powders are often as equally subject to difficulty in handling as the original materials. Further, when the mixing requires wetting, there is the additional difficulty that the products usually can be dried only with extreme difficulty.

There remains, therefore, an unsatisfied demand for a process of combining two or more materials into a mixture in which they are substantially uniformly disseminated yet which mixture is free from the objectionable features of being difficult to collect and dry and being subject to objectionable dusting. Preferably, too, the process should be capable of combining the materials in a physical aggregate larger in size than the dusty fine powders obtainable by ordinary methods of combination.

It is, therefore, a principal object of the present invention to provide a process capable of satisfying these requirements. A further object is to make combined products which do not separate, are not fine powders and which are substantially free from disagreeable physiological effects.

Typical of the problems of this type is the use of a material such as nitroso beta naphthol and a material such as abietic acid in formulating vulcanizable synthetic rubber compositions. This procedure will, therefore, be taken as illustrative of the present invention, its problems and their solution. The invention, however, is by no means necessarily so limited.

Figure 1:
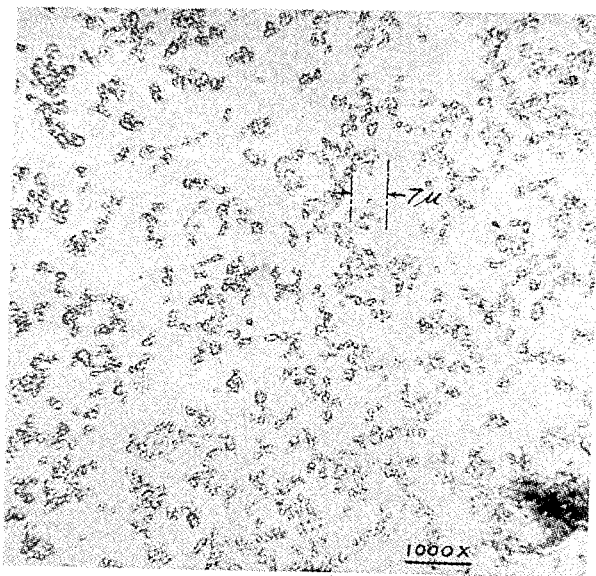
Figure 2:
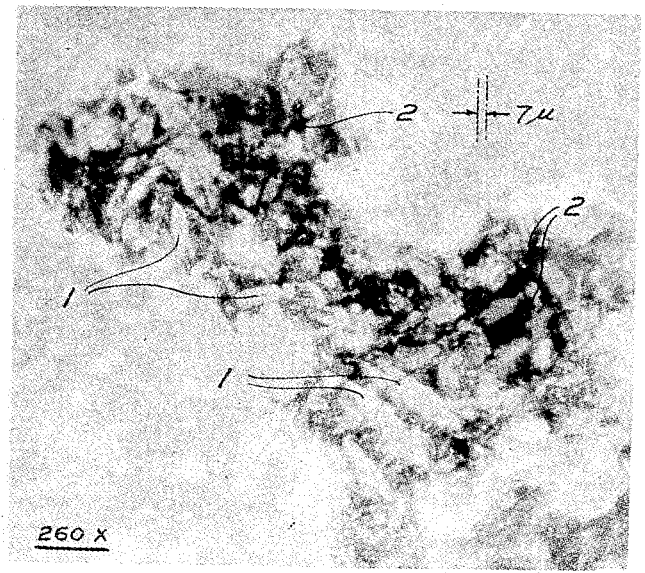

The invention will be more fully pointed out in conjunction with the accompanying drawing in which:

Figure 1 is a photomicrograph of the product obtained by ordinary co-precipitation, and Figure 2 is a photomicrograph of the product obtained according to the present invention.

As pointed out above, both nitroso beta naphthol and abietic acid are extensively used in natural and synthetic rubber compositions, the abietic acid being usually present to the extent of about 10% of the nitroso beta naphthol. Abietic acid as used in this connection is not necessarily the pure chemical compound, but is generally the mixture of acids principally abietic, which is found in rosin and frequently designated as rosin acid. As used in the present specification and claims that meaning is applied to the term abietic acid.

If an attempt is made to dry mix or to co-precipitate the two by ordinary procedures, or to precipitate the abietic acid from solution and add the resultant precipitate to a suspension of the nitroso beta naphthol, the result is a very finely divided powder. For purposes of illustration a sample was prepared by dissolving ten parts of rosin acids with caustic soda and reprecipitating it by acidification with sulfuric acid. The precipitate was then slowly added with mixing to a suspension of nitroso beta naphthol, the product being collected by filtration and air-dried at about 45° C. A sample of the product was photomicrographed at a 1000 magnification, the result being shown herewith as Figure 1. For purposes of comparison a distance of seven microns has been marked on the illustration. The uniform, finely divided size is readily apparent.

In addition to the small size, which is still subject to excessive dusting, and the production of severe dermatitis conditions when handled, this product has a number of additional objetcionable features. First of all it bulks so extensively that the capacity of the apparatus is reduced by about one-fifth. Secondly, the filter cake, which appears quite dry, actually contains about 70% moisture. This water is extremely troublesome to remove, requiring extensive air-drying facilities. The air-drying temperature must be held below about 45°-50° C. in order to prevent the separation of abietic acid as a gritty, separate constituent.

According to the present invention it has been found that these difficulties can be overcome by carrying out the co-precipitation under conditions such that comparatively large pellets are formed. When this is done the pellets are found to consist of crystals of the nitroso beta naphthol cemented together by an eutectic of the nitroso beta naphthol and abietic acid.

In general, this is accomplished by bringing together suspensions of the two, finely-divided materials and then heating the mixture under conditions which permit forming the eutectic and promote some crystal growth. When the desired pelleting has been accomplished the materials are rapidly cooled to prevent additional agglomeration.

The first step in the production of the products of the present invention is the preparation of a slurry of the two materials. In the case of the nitroso beta naphthol and the abietic acid of the illustration this may be done in any one of several ways. If so desired a suitable quantity of finely divided abietic acid may be directly slurried in a suitable amount of water.

An extremely fine suspension of abietic acid is readily obtained by dissolving the material in water containing an excess of caustic soda or other strongly-alkaline material. Upon acidification, the abietic acid is precipitated in a very finely divided form. Any suitable acid, such as sulfuric or the like, may be used to carry out the acidification. Preferably, but not necessarily, any excess acid is finally neutralized with some relatively weakly-alkaline material such as sodium bicarbonate or the like.

This suspension is then added to a suspension of finely divided nitroso beta naphthol. Again this may be carried out in any one of several ways, as for example, by preparing a slurry of the nitroso beta naphthol per se. We have found, however, that a preferred procedure is to dissolve an equivalent amount of beta naphthol and add the reprecipitated abietic acid to this solution preferably while violently agitating the same. If this mixture is cooled and a strong nitrosating agent such as sodium nitrite is then added, nitroso beta naphthol is formed in situ, a procedure which greatly facilitates obtaining the desired product. The result of the nitrosating step is the production of a slurry of both materials.

This slurry, the temperature of which was necessarily lowered during the nitrosating step to about 4° to 8° C. or below, is then heated, under continued agitation, to increase its temperature to the point at which formation of the eutectic of nitroso beta naphthol and the abietic acid takes place. This temperature will vary somewhat with conditions between about 60°–65° C. and about 90° C. A physical change in the appearance of the slurry takes place at this point, a brownish solid material apparently separating out.

If heating is continued at this temperature of about 60°–90° C. for a short period, the solids appear to darken and suddenly appear to coagulate as pellets of a solid material which readily separate out. If at this point the temperature is lowered as rapidly as possible to below about 50° C., further agglomeration of the pellets is prevented. It is, therefore, apparent that the final pellet size can be controlled somewhat both by the degree of agitation and by the speed at which the temperature is reduced after pellets begin to form.

The pellets so formed are readily collected by filtration. Instead of containing some 70% of water, they ordinarily contain as little as 15% or less. Further, the water is largely held on the surface of the aggregate and may be very much more readily dried than is the case of the finely divided co-precipitate obtained by ordinary procedures.

This is particularly fortunate because it is not practical to dry the material at temperatures above about 45° C. Appreciable higher temperatures tend to lower the softening point of the product and make it less satisfactory to handle. It also produces a very appreciable saving in drying time and equipment. For example, a 100 lb. filter cake of the material shown in Figure 1 will contain about 70 lbs. water which requires about 50 hours for its removal by air drying at 45° C. A similar 100 lb. batch of the product as prepared according to the present invention contains only about 15–17 lbs. water which can be removed in only 10 hours. Expressed in other terms, a 500 lb. batch can be handled in the same length of time that a 100 lb. batch of the material of Figure 1 can be handled, producing 435 lbs. of the product of Figure 2 as compared with 30 lbs. of the product of Figure 1. It also should be noted that in the same length of time the dryer has removed about 85 lbs. of water as compared with 70 lbs. in the case of the fine material, an increase of 20–22% in the efficiency of the dryer.

The product produced according to the present invention, therefore, has a number of advantages. The two materials are combined in a form in which they are not readily separated, the product is free-flowing and non-dusting. A given set of apparatus can produce 14–15 times the amount of product in the same length of time. The product is equally useful in the production of rougher compounds. The product no longer creates handling difficulties.

One procedure of producing material in accordance with the present invention is set forth in the following example, which is given for purposes of illustration only and not by way of limitation. All parts are by weight unless otherwise noted.

Preparation

To 3600 parts of water at 70° C. in a wooden tub, add with stirring 3750 parts of 24% sodium hydroxide solution. Then add 3000 parts of beta naphthol and 300 parts of abietic acid and stir to complete solution at 70° to 75° C. Charge into a wooden tub 10,000 parts of ice and add 2400 parts of 93% sulfuric acid. Stir and dilute with water and ice to 21,600 parts by volume at 5° C. Charge into a wooden tub 2165 parts of water and add 1440 parts sodium nitrite. Stir the solution and add this solution to the beta napthol-abietic acid solution. Ice the total solution to 4° to 8° C. Stir and add to the sulfuric acid solution uniformly over a period of four hours, holding the temperature at 4° to 8° C. Stir for one hour after the addition is complete. Make up a solution of 300 parts water and 50 parts sodium bicarbonate. Add this to the solution after one hour's stirring to neutral test on Congo Red paper. Use more bicarbonate solution if required.

Pelletization

A portion or all of the above preparation may be treated at one time depending upon the stirring, heating facilities, and available ice. One-fourth of the above is recommended. Heat as rapidly as possible with vigorous agitation. When the temperature reaches 45°–55° C., solids separate from the brown milky liquid and float on the surface like a foam. At between 60° and 90° C., the material on the surface will become deeper brown in color and noticeably more dense. The liquid will sweep in from the edges and suddenly engulf the solid into the vortex. The solid becomes very dense and black in color and the liquid appears clear and dark in color. Shut off the steam immediately at this point and ice to about 50° C. Filter by suction and wash the product on the filter with 654 parts of water. Dry in an air dryer at 45° C.

A sample of the product so obtained was mounted in embedding wax and cross-sectioned on a rotating Microtome. The sample was then etched slightly with sodium bicarbonate and subjected to microscopic examination. At a 260 magnification, the product combines relatively large, somewhat yellowish crystals embedded in a black matrix. A photomicrograph of this sample comprises the accompanying Figure 2 in which the nitroso beta naphthol crystals are designated as 1 and the dark matrix is designated as 2. Physically separated samples of the embedded crystals proved on examination to be substantially pure nitroso beta naphthol. The black matrix 2 proved on examination to be an eutectic of nitroso beta naphthol and abietic acid.

From the foregoing it will be apparent that the essential features of the present process may be listed as follows. The materials to be combined must be capable of forming a solid eutectic mixture. The materials are slurried together in a finely divided form and the slurry heated to the point at which the eutectic composition forms by mutual solution of one of the materials and at least a part of the other. The heating is continued to permit forming the desired pellets of crystals of one material in the eutectic matrix. The mass is cooled at a rate to produce the desired pellet size in a form which is free-flowing and non-sticking when collected and dried.

We claim:

1. A method of forming a pelletized non-dusting mixture of nitroso beta naphthol and abietic acid which comprises dissolving together beta naphthol and abietic acid, cooling the solution to less than about 10° C., adding a nitrosating reagent, acidifying the solution, and stirring the cooled mixture until formation of the nitroso beta naphthol is substantially complete, neutralizing the resultant solution, heating the neutralized solution as rapidly as possible until a solid eutectic comprising the abietic acid and part of the nitroso beta naphthol forms, continuing the heating until the solid becomes dark colored and suddenly separates from the fluid, as pellets of eutectic having the remainder of the nitroso beta naphthol dispersed therein, rapidly cooling the mass and collecting the solids content thereof.

2. A free-flowing, non-dusting pelletized mass comprising crystals of nitroso beta naphthol cemented with an eutectic comprising nitroso beta naphthol and abietic acid.

VICTOR L. KING.
HENRY PHILIP OREM.